3,761,293
CERAMIC COATING COMPOSITIONS FOR
CONTINUOUS CLEANING SURFACES
George F. Carini and Ernest M. Hommel, Pittsburgh, and James R. Twigger, Houston, Pa., assignors to The O. Hommel Company, Carnegie, Pa.
No Drawing. Filed Apr. 27, 1971, Ser. No. 137,984
Int. Cl. C03c 5/02, 7/02, 7/04
U.S. Cl. 106—48   9 Claims

ABSTRACT OF THE DISCLOSURE

This invention relates to compositions and methods for forming and applying compositions which becomes durable adherent ceramic direct-on coatings with catalytically active surfaces after firing at elevated temperatures. The coatings are prepared from a batch comprising a devitrifiable base, glass or frit, a barium yielding glass or glass-forming compound such as lithium-barium-calcium-fluoroborate and either an oxide such as antimony oxide or cerium oxide or a metal such as polished aluminum powder.

BACKGROUND

Cooking devices, for example, the oven of an ordinary kitchen cooking range, commonly acquire a coating of food residues on their exposed surfaces during use. These organic residues include, for example, grease splatters, sugar-containing syrup spills and other volatilized organic residues that deposit upon the oven walls. It is an advantage of our invention to provide ceramic coatings for oven walls with inherent catalytic activity for causing oxidation of these residues. Conversion of food residues into harmless products such as water and carbon dioxide is desirable to satisfy the requirements of appearance and to avoid undesirable oven odors.

Ceramic coatings according to this invention are useful in numerous other applications. For example, they are useful for coating at least portions of the interior of the exhaust systems of internal combustion engines. Typically, the exhaust from these engines contain smelly, unburned hydrocarbons, dangerous carbon monoxide and corrosive nitrous oxides. Our ceramic coatings aid in reduction of the air pollutants and serve to protect the exhaust system itself from corrosive by-products and undesirable deposits.

Further, our coatings may be usefully supported on suitable substrates, such as metallic or ceramic honeycombs, as the catalytically active element in certain afterburner exhaust systems. A major drawback of catalyst and catalyst carriers of the prior art is the susceptibility to abrasion which results in the destruction or clogging of the system and the deadening of the catalytic activity. However, our coating not only protects the substrate from chemical and mechanical attack but also provides a catalytic surface.

PRIOR ART

Hurko (U.S. Pat. No. 3,121,158) teaches removing organic residues from oven walls by heating to temperatures in the range of 750° to about 900° F. In this way, the deposits are thermally degraded and may be thereafter removed by wiping the degraded deposit from the oven surface. This method requires a special oven construction to dissipate the distorting stresses resulting from high temperatures. More recently, Stiles (U.S. Pat. No. 3,266,477) teaches providing a coating of a suitable catalyst upon oven surfaces to oxidize the food residues at temperatures in the range 400° to 500° F. Thereafter, the oxidized residue may be wiped from the surfaces of the oven. Similarly, a self-cleaning surface for a cooking apparatus comprising a two-layer coating is taught by Morgan (U.S. Pat. No. 3,545,423). The first layer is a mixture of ceramic and catalytically active material. The second layer of the coating consists of catalytically active materials only. Another reference, Lee (U.S. Pat. No. 3,547,908) describes a vitreous matte or semi-matte composition adaptable for oxidizing organic dirt. The Stiles, Morgan and Lee patents disclose commonly known catalysts, for example, oxides, cerates, manganates,, manganites, chromates, chromites and vanadates of cobalt, nickel, ruthenium, palladium, platinum and rare earth metals.

Schwartzwalder and Somers (U.S. Pat. No. 3,090,094) teach the use of a porous ceramic structure and well known catalytic oxides, such as chromium oxides, nickel oxide, copper oxide or vanadium pentoxide or porous ceramic structures coated with platinum as hydrocarbon oxidation catalysts for afterburners. Blome (U.S. Pat. No. 3,507,357) describes ceramic coated mufflers.

A large number of cooking ranges are now in use having self-cleaning ovens of the pyrolytic or catalytic type in which the oven walls are made of comparatively thin iron or steel coated in a double coating process with a devitrifiable enamel placed over a common vitreous ground or base coat. The devitrifiable enamels are comprised of a porous crystalline surface with inherent catalytic and residue removing properties. This is a major departure from the vitreous glassy porcelain enamels of the past. Hence, enamel coatings of the catalytic type must be fused on the sheet metal at comparatively high temperatures, for example, from 1400° to 1600° F. Because of their refractoriness, devitrifiable enamels have not been applied directly to metal surfaces on a commercial scale without great difficulty. Poor adhesion to the metal substrate and defective surfaces have characterized catalytically active coatings applied "direct on" over steel without a conventional intervening vitreous enamel ground coat. Other attempts to alter the devitrifiable enamels for direct-on application have destroyed the catalytic properties.

Consequently, ground coats have been used to provide a glass adjacent the metal. The ground coats are typically those containing cobalt oxide or cobalt oxide and nickel oxide. They provide good adhesion to the metal and good surface properties by dissolving or absorbing the iron oxide, hydrogen and carbon gases formed during the firing processes at the enamel-metal interface. Catalytically active coatings applied over the ground coats may be free of imperfections and may adhere strongly to the glass of the ground coat. However, costs are substantially increased in the manufacture of oven cavities or panel inserts when two applications of enamel are required.

SUMMARY OF THE INVENTION

According to our invention, there is provide durable strongly adherent ceramic coatings which after firing at elevated temperatures, exhibit a catalytically active surface and which may be applied directly to a metal or ceramic substrate either with or without an intervening layer of glass or ground coat.

It is an advantage of this invention to provide strongly adherent catalytically active direct-on ceramic coatings free of surface imperfections suitable for use, for example, in self-cleaning ovens, exhaust systems and afterburners. As a result of our discovery, self-cleaning ovens or their panel inserts may be produced economically at a substantial reduction in cost while maintaining the quality of the finished product.

It is another advantage of this invention to provide adherent enamel coatings having catalytically active surfaces after firing which are applied as a single coating to ferrous metals or ceramics, while avoiding scaling, warping, forming of gas bubbles and the necessity of applying a base or ground coat to obtain good bond or adherence.

It is a further advantage of this invention to provide stable enameling compositions which can be prepared ready for application to ferrous metal or ceramic substrates, such that they may be retained in their prepared and ready for use state.

Briefly, according to this invention, a direct-on devitrifiable enamel is prepared from a batch comprising a devitriable base frit and a two-part adherence and surface quality system plus the usual mill additions to provide the rheological properties necessary for an enamel slurry or slip. The devitrifiable base frit may have a wide range of chemical compositions but is basically characterized by high refractoriness, a partially crystalline structure after firing and very poor adherence qualities on ferrous metals.

This invention does not specifically relate to any particular devitrifiable base enamels, but several preferred examples are set forth below. The general oxide analysis of two types of devitrifiable base frits are as follows:

|  | Percent of— | |
|---|---|---|
| Alkali oxides | 5–15 | 10–25 |
| Silica | 30–40 | 25–40 |
| Alumina | | 15–25 |
| $MnO_2$ | 30–35 | |
| Other oxides and fluorides | 10–35 | 10–50 |

The two-part adherence and surface quality systems according to this invention comprise (1) adherence promoting metals and metal oxides preferably materials selected from the group consisting of polished aluminum and aluminum alloy powders, antimony oxide, cerium oxide, iron oxide and copper oxide, and (2) a barium-yielding glass or glass-forming material. The barium yielding material preferably comprises an alkali alkaline earth fluoroborate frit. It should be understood that cerium oxide, iron oxide and copper oxide are preferably used in combination with either the polished aluminum powder or antimony oxides in the first part of the two-part system.

Preferably, the devitrifiable base frit comprises 100 parts of the coating; the barium-yielding glass or glass-forming material, 4 to 30 parts, the polished aluminum powder, up to 30 parts, the antimony oxide, up to 5 parts, the cerium oxide, up to 3 parts and powdered metal oxides, up to 20 parts. The polished aluminum, antimony oxide or cerium oxide or mixtures thereof comprise 1 to 30 parts. Optimal adherence and surface quality systems comprise 5 to 10 parts alkali alkaline earth fluoroborate frit based on 100 parts base frit and 2 to 4 parts antimony oxide. Yet another optimal adherence and surface quality system comprises 5 to 10 parts alkali alkaline earth fluoroborate frit, 1 to 6 parts polished aluminum and 5 to 20 parts of finely divided iron oxide and copper oxide. Still another optimal adherence and surface quality system comprises 18 to 30 parts alkali alkaline earth fluoroborate frit and 15 to 30 parts of polished aluminum.

DETAILED DESCRIPTION

Further features and other objects and advantages of our invention will become clear to those skilled in the art after careful study of the following detailed description.

To coat ferrous metals, such as enameling iron or cold rolled steel, from which, for example, the oven cavity of a cooking range is constructed, it is important that the metal be carefully cleaned before the enamel is applied. The cleaning consists of sandblasting or boiling the metal in a cleaner which may be one of a large number of well known cleaners now on the market. This sandblasting or boiling treatment removes grease and dirt. After the boiling treatment, the steel is rinsed with hot water and then given a pickling treatment, for example, in a 7% solution of sulphuric acid heated to a temperature of about 140° F. The pickled or sandblasted metal is then rinsed with water and placed in a solution of nickel sulphate for the purpose of depositing a thin film of nickelous oxide of not less than 0.02 or greater than 0.12 gram per square foot on the surface of the metal. This is referred to as nickel flashing. The nickel-flashed steel is rinsed again with water to complete the cleaning operation and then neutralized to remove acid and dried. For a more complete description of the general procedures of application of porcelain enamels to metal substrates, reference is made to "Enamels, the Preparation, Application and Properties of Vitreous Enamels" by Andrew I. Andrews (The Garrad Press, Champaign, Ill., 1935).

Frits are prepared by smelting operations in which dry ingredients containing the oxides are mixed together and heated in a furnace at temperatures from about 1800 to 2400° F. to melt the batch components. The preferred chemical compositions of exemplary base frits and a barium-yielding glass frit suitable in the practice of this invention are shown in Table I. Also shown are the actual analyses of Base Frits A and B and a barium-yielding Glass Frit C and Glass Frit D used in the examples described below. Throughout this specification and the attached claims, weight percentages and parts by weight are meant wherever percentages and parts are considered.

TABLE I

| Oxide | Base frit, percent of— | | | | Glass frit, percent of— | | |
|---|---|---|---|---|---|---|---|
|  | Preferred range | Frit A actual | Preferred range | Frit B actual | Preferred range | Frit C actual | Frit D actual |
| $Na_2O$ | 1.5–5 | 1.73 | 0.1–20 | 15.79 | 0–15 |  | 15.0 |
| $K_2O$ | 5–6 | 5.58 | 0.1–20 | 0.60 | 0–10 |  | 1.93 |
| $Li_2O$ | 0.5–1 | 0.65 | 0.1–20 | 0.45 | 0.1–10 | 8.15 | 0.92 |
| $Al_2O_3$ | 1.5–3.5 | 1.64 | 16–26 | 21.55 | 0–5 |  | 4.12 |
| $B_2O_3$ | 2–4 | 2.73 | 0–1 |  | 15–58 | 39.35 | 17.11 |
| $SiO_2$ | 31–37 | 34.34 | 26–42 | 34.65 | 0–35 |  | 33.10 |
| $F_2$ | 0.5–1.5 | 0.77 | 0–8 | 4.54 | 0.1–12 | 9.66 | 3.06 |
| $TiO_2$ | 6–10 | 8.19 | 0–6 | 3.33 |  |  |  |
| $ZrO_2$ | 0–1 | 0.15 | 0–10 | 7.23 |  |  |  |
| $MnO_2$ | 27–35 | 31.93 |  |  |  |  |  |
| CaO |  |  | 0–6 | 3.32 | 0–21 | 14.29 | 6.82 |
| BaO |  |  | 0–4 | 2.03 | 12–42 | 28.54 | 14.12 |
| ZnO | 4–5 | 4.34 | 0–4 | 2.14 | 0–4 |  | 3.46 |
| $Sb_2O_3$ | 6–10 | 6.51 | 0–3 | 1.79 |  |  |  |
| $Fe_2O_3$ | 0–2 | 0.68 | 0–3 | 1.21 |  |  |  |
| $P_2O_5$ | 0–1 | 0.79 | 0–3 | 1.37 | 0–2 |  | 0.95 |

The molten frit is discharged after smelting into a body of water or passed through water cooled rolls to solidify the frit in the form of granular glass. Granular glass frits are then treated to form slips or slurrys by grinding (ball milling) in a water or another suspension vehicle to a finely ground state. The grinding is preferably to a fineness of ½ to 1½ grams retained in a 200-mesh screen from a 100-gram sample. Slips suitable for the practice of this invention and as more fully described below are shown in Table II.

TABLE II

| Example | I | II | III |
| --- | --- | --- | --- |
| Base frit A (parts) | 100 | 100 | |
| Base frit B (parts) | | | 100 |
| Glass frit C | 5 | 5 | 24 |
| Antimony oxide powder | 2 | | |
| Copper oxide powder | | 5 | |
| Iron oxide powder | | 5 | |
| Polished aluminum powder | | 3 | 22 |
| Clay | 4 | 4 | 1/2 |
| Sodium nitrite | 1/2 | 1/2 | 1/2 |
| Potassium carbonate | 1/16 | 1/16 | 1/16 |
| Polysaccharide gum | 1/4 | 1/4 | 1/4 |
| Hydrousmagnesium silicate | 1/32 | 1/32 | 1/32 |
| Water | 45 | 50 | 50 |

Other soluble or insoluble solid or liquid milling components such as clay, colloidal silica, sodium nitrite and potassium carbonate are added to the slip as part of the milling charge of the ball mill to adjust the rheological properties of the slip. Soluble component compounds added to the mill batch to control the properties of the slip are termed electrolytes. Also, coloring pigments may be added to the frit as they are being prepared as slips.

Preparation of the slip provides a suspension of the finely divided frits and metal oxides in water or other liquid vehicles to a consistency such that the material may be applied to ferrous metal or ceramic articles by spraying, dipping or flow coating in a conventional manner. The coating is applied to a thickness, for example, from 4 to 20 mills on a dry basis uniformly covering the entire surface. It is preferable to apply a series of thin coatings, one after another to build up the desired enamel thickness rather to use a single application.

Following normal enameling procedures, the coated articles are placed in a dryer at a temperature sufficient to remove excess water which is usually about 200° to 250° F. and then placed in a furnace and fired at a temperature from about 1400° to 1550° F. preferably about 1480° F. for about 3 minutes for the purpose of maturing the coating to the extent that it forms a uniform coating which adheres strongly to the ferrous article. The firing time or temperature may be varied depending on the dimensions of the article and other factors. A coated ferrous article is then removed from the furnace and cooled.

Ceramic coatings are evaluated for surface defects visually. One looks for blisters, continuity of coating, fish scales and other bumps and irregularities, which are all deemed undesirable. Adherence is determined visually or instrumentally using the Porcelain Enamel Institute hydraulic test apparatus. Generally, 50% or more glass remaining on a deformed area after testing is considered satisfactory.

There are yet no standard tests for catalytic activity of ceramic coatings. However, we use the following: The fired coatings are heated in open air to a surface temperature approximating the upper limit of oven operating temperatures. The high B.t.u. rated burner of an electric or gas range set in a high position is a satisfactory heat source. A drop of corn oil is applied to the hot test panel. The time required for the soil to disappear is visually determined. This disappearance of the stain in less than 15 minutes is considered satisfactory activity indicating that the coating would clean at cooking, baking and boiling temperatures during normal cooking cycles. Formation of a carbonized film or residue indicates little or no catalytic activity and the coating is rated unsatisfactory.

Our invention will be described further in relationship to the following examples.

EXAMPLE I

Several 9" x 12" panels, 36 mills thick, composed of low carbon, decarburized and cold-rolled steel were cleaned, etched, nickel dipped, neutralized and dried following the conventional metal pretreatment procedures of the porcelain industry described above. Each panel was coated by the conventional methods of spraying, dipping and flow coating with the suspension in water of 100 parts of devitrifiable Base Frit A, 5 parts of barium-yielding lithium alkaline earth fluoroborate Frit C, the compositions of which are given in Table I, 2 parts antimony oxide, and sufficient clay and electrolytes to obtain the desired slip consistency. The coated panels were dried and then fired at 1480° F. for about 3 minutes. The resulting coatings on all test panels were suitable for use in continuous cleaning or self-cleaning oven cavities without further treatment. The coatings were free of surface defects and bonded firmly to the metal substrate. Each passed the above-described tests for catalytic activity. Slips prepared using the mill additions given in Table II were observed to remain stable for test periods of 30 days after which the enamels were ready for use. The coating comprises at the surface a network of myriads of minute crystals identified, using X-ray diffractometric techniques, as the minerals braunite and pyrophanite. Braunite has the approximate formula $MnO \cdot 3Mn_2O_3 \cdot SiO_2$, and pyrophanite, $MnOTiO_2$. Cobalt oxide, nickel oxide or other colorants could have been added while preparing the slip to adjust the color of the fired coating.

The use of an alkali alkaline earth fluoroborate frit is preferable over other barium-yielding materials where the metal has a tendency towards grain growth, for example, cold-rolled steel. The glass frit should preferably have a composition that is compatible with ferrous metals having thermal expansion coefficients in the range 10 to $15 \times 10^{-6}$ in./in./degree F. Lithium and fluorine, as in Frit C, in the frit help to achieve the desired thermal expansion. However, the barium-yielding material for coating enameling iron grades such as U.S. Steel Vit II may be barium borate or a frit such as Frit D shown in Table I.

EXAMPLE II

Other 9" x 12" test panels were prepared in the same manner at described for Example I. The panels were coated with a suspension in water of 100 parts of Base Frit A, 5 parts of lithium alkaline earth fluoroborate Frit C, the composition of which is set forth in Table I, 13 parts of a mixture of metal and metal oxide powders comprising 3 parts polished aluminum powder; 5 parts copper oxide and 5 parts iron oxide. The polished aluminum is a finely divided, that is, substantially minus 200-mesh, powder, preferably having an organic, for example, stearate, coating. Sufficient clay and electrolytes to obtain the desired consistency were added to the slip. The resultant coating after firing as described above was suitable for use in continuous cleaning or self-cleaning oven cavities without further treatment.

EXAMPLE III

Yet other 9" x 12" test panels were prepared in the same manner as described for Example I. The panels were coated with a slip comprising a suspension in water of 100 parts of Base Frit B, the composition of which is given in Table I, 24 parts of lithium alkaline earth borate frit also given in Table I and 22 parts of aluminum powder plus sufficient clay and electrolytes to provide the desired rheological properties of the slip X-ray diffractometric analysis of the fired coating showed the presence of the following crystalline phases: aluminum (Al); barium aluminate ($3BaO \cdot Al_2O_3$); and barium silicate ($5BaO \cdot 8SiO_2$). After firing these coatings were suitable for use in continuous cleaning or self-cleaning oven cavities without further treatment.

EXAMPLE IV

To further illustrate the importance of the use of antimony oxide, test panels were prepared as described in Example I from a coating of a slip containing 4 parts of antimony oxide added to a mill formulation containing 100 parts of devitrifiable Frit A, 5 parts of lithium alkaline earth fluoroborate, 4 parts lithium titanate, 3 parts cobalt oxide, 3 parts sodium silicate "F," a product of E. I. du Pont de Nemours Co., and sufficient clay and electrolyte to control the rheological properties. This slip was sprayed on test panels composed of 20 gage steel and the coating dried and fired at about 1480° F. for 3 minutes. This coating after firing was bonded firmly to the metal substrate and exhibited at a high degree of catalytic activity and was free from imperfections.

EXAMPLE V

To a slip formulation of Example I containing 2 parts antimony oxide were added from 5 to 25% of "Catalyst 91," a product of E. I. du Pont de Nemours Co. The fired coating containing both antimony oxide and the catalyst bonded thermally to the metal substrate, exhibited a high degree of catalytic activity and freedom from imperfections.

Examples IV and V demonstrate that the bonding and surface quality agents accordinng to this invention are not sensitive to other common additives to ceramic coatings. Hence, a wide variety of colors and properties can be achieved with compositions which are based upon our basic compositions.

The enamel coatings formed for use in the present invention preferably have the compositions disclosed in Examples I, II and III. The properties of these ceramic coatings are indeed surprising in view of the numerous similar enamel coatings which lack catalytically active surfaces, or which exhibit no or only poor adherence to a ferrous metal substrate, or which are characterized by defects such as bloats.

EXAMPLE VI

By way of comparison, 9" x 12" test panels prepared according to the procedure described in Example I were coated by conventional methods with a suspension in water of 100 parts of devitrifiable Base Frit A, 5 parts of lithium alkaline earth fluoroborate Frit C and sufficient clay and electrolytes to obtain the desired consistency. After firing at 1480° F. for about 3 minutes, the resultant coating was not suitable for use in continuous cleaning or self-cleaning oven cavities since the coating did not bond or adhere to the ferrous metal substrate. This example illustrates the criticalness of a metal oxide, such as antimony oxide or cerium oxide or of polished aluminum in promoting adherence of the coating to a ferrous metal substrate.

EXAMPLE VII

Further by way of comparison, well known systems for fixing base coats to metal substrates comprising either 3 parts sodium silicate "F," 4 parts of lithium titanate, 3 parts of cobalt oxide, or 10 parts of "Catalyst 91" were added separately to the slip formulation of Example VI. Slips containing each of the above components were prepared and applied by spraying test panels composed of 20 gage low carbon steel. The coated panels were dried and then fired at about 1480° F. for 3 minutes. The fired coatings containing each of the above components did not bond to the ferrous metal substrate making them unsuitable for use in oven cavities. Hence, it is established that the devitrifiable base frits are very difficult to bond to metal surfaces in a direct fashion.

Exhaustive laboratory tests indicate that satisfactory substitutes for antimony oxide which promotes satisfactory bonding to ferrous metal substrates are limited. Cerium oxide was found to be a satisfactory substitute for antimony oxide only when added in less than about 3 parts by weight based on 100 parts base frit. An addition of 4 parts cerium oxide to the same slip formula yielded a fired coating having unsatisfactory bond. Surprisingly, an addition to 5 parts of cerium oxide to the slip formulation given in Example I which contains 2 parts of antimony oxide also yielded a fired coating which did not bond well to the metal substrate.

EXAMPLE VIII

Further, by way of comparison, other test panels were coated by the conventional method of spraying a suspension in water of 100 parts of devitrifiable Base Frit A, 5 parts of sodium silicate "F" and sufficient clay and electrolytes to control consistency of the slip. The sprayed panels were dried at 220° F. and fired at 1480° F. for about 3 minutes. The resultant coating was not suitable for use in continuous cleaning or self-cleaning oven cavities. The coating did not bond or adhere to the ferrous metal substrate. Further, the coating was defective because of the presence of bloats. This example illustrates the criticalness of the presence of a barium yielding glass or glass-forming compound such as an alkali alkaline earth fluoroborate glass or, for example, lithopone, comprised of barium sulphate, zinc sulphate and zinc sulphide.

EXAMPLE IX

To further illustrate the criticalness of the presence of a barium yielding glass or glass-forming component, suspension in water of 100 parts of the devitrifiable Base Frit A, 5 parts of an alkaline earth borate Frit C and sufficient clay and electrolytes to control the properties of the slip were prepared. A second slip was prepared in which 5 parts of lithopone was substituted for the alkaline earth borate frit. Each enamel slip was applied by spraying to test panels composed of 20-gage steel. Each coated panel was dried and then fired at about 1480° F. for 3 minutes. Both fired coatings were free of bloat defects. Neither coating, however, adhered to the ferrous metal substrate. An addition of two parts of antimony to each of the above slip formulas yielded at fired coatings having satisfactory adherence and freedom from bloat-type defects.

EXAMPLE X

By way of comparison, panels were coated by the conventional method of spraying a suspension of slip comprisinig water and 100 parts of devitrifiable Base Frit A, 5 parts of copper oxide powder, 5 parts of iron oxide powder, 5 parts of lithium alkaline earth fluoroborate Frit C and sufficient electrolytes to control the properties of the slip. The coated panel was dried and fired at about 1480° F. for 3 minutes. The fired coating did not bond to the ferrous metal substrate making it unsuitable for use in oven cavities. Comparing this example to Example II establishes that the addition of only 3 parts of aluminum powder to the above slip formula is essential to obtain a catalytically active coating having a satisfactory bond.

EXAMPLE XI

By way of comparison, test panels were coated by the conventional method of spraying a suspension in water of 85 parts of a fritted glass similar to Base Frit B. The frit comprised the following formula: $Na_2O$, 12.33%; $K_2O$, 0.47%; $Li_2O$, 0.35%; $Al_2O$, 17.64%; $B_2O_3$, 11.76%; $SiO_2$, 27.02%; $F_2$, 3.54%; $TiO_2$, 2.60%; CaO, 2.59%; $P_2O_5$, 0.91%; $ZrO_2$, 5.60%; ZnO, 1.59%; $Fe_2O_3$, 2.47%; BaO, 9.77% and $Sb_2O_3$, 1.36%. In addition to the 85 parts of fritted glass, the slip comprised 15 parts of aluminum powder and sufficient electrolytes to control the rheological properties of the slip. The coated panel were dried and then fired at about 1480° F. for about 3 minutes. The fired coating did not bond on the ferrous metal substrate and, furthermore, did not exhibit a catalytically active surface. The coating was characterized by severe bloating and had a glassy appearance. This result is surprising in that the total oxide composition of a coating is equivalent to the coating described in Example III. It is essential then that the barium-yielding materials or barium glass, for example, alkali alkaline earth fluoroborates are not incorporated into the devitrifiable base frit for they destroy the catalytic properties of the base frit and further are not present to cooperate with the non-granular aluminum powder or antimony oxide to provide the desired adhesion and surface qualities.

Further, by way of comparison, test panels were coated with a frit comprising the following formula:

| Oxide: | Weight percentage |
|---|---|
| $B_2O_3$ | 3.1 |
| $Na_2O$ | 6.8 |
| $SiO_2$ | 35.2 |
| $K_2O$ | 5.6 |
| BaO | 1.8 |
| $MnO_2$ | 25.7 |
| CaO | 0.5 |
| $Li_2O$ | 0.8 |
| ZnO | 4.2 |
| $P_2O_5$ | 0.6 |
| $TiO_2$ | 8.6 |
| $Sb_2O_5$ | 7.1 |

The frit was prepared by melting the following batch ingredients at 2350° F. (1280° C.) and quenching in cold water.

A slip, consisting of a suspension in water of 100 parts of the above frit, ½ part Polytran FS and ½ part sodium nitrate was prepared by milling to a fineness of 10 grams on 400 mesh per 50 cc. of enamel. This coating was applied by the conventional method of spraying at an application weight of 30 grams per square foot to test panels consisting of cold-rolled steel, enameling iron (U.S. Steel Vitrenamel II) and decarburized steel (U.S. Steel Vitrenamel I). The coated panels were dried and then fired at 1450° F. (1288° C.) for three minutes. The fired coating exhibited no bond on enameling iron and decarburized steel and poor to fair bond on cold-rolled steel. Severe bloating of the coating was observed on cold-rolled steel and enameling iron and moderate bloating on decarburized steel.

Catalytically active coatings according to this invention may be applied to ceramic surfaces as well as metal surfaces. An alumina base honeycomb known by the proprietary name as "Du Pont Torvex Honeycomb" was dipped in the slip or slurry described in Example II. The honeycomb was dried and then fired over a period of about six minutes with an approximate hold time of 3 minutes at 1480° F. A well adherent, blister-free catalytically active coating was developed over the surface of the honeycomb.

The mechanism of reaction by which food residues, hydrocarbons or carbon monoxide are converted to water and carbon dioxide when in contact with the fired coatings of our invention is not entirely understood. We believe that the catalytic activity of the coatings of our invention reside principally in the texture of the coating; that is, in the structure and arrangement of the coherent particles formed on firing at elevated temperatures by the partial or complete devitrification of the glass components and the open spaces between these particles. Hence, any additive to the frit which will inhibit its crystallizing or devitrifying properties will destroy its catalytic properties. However, according to this invention, the use of an alkali alkaline earth fluoroborate glass forming composition in combination with antimony oxide, cerium oxide or aluminum powder as separate batch additions to the devitrifiable frit does not destroy the devitrifying properties and still enables a well bonded, smooth surfaced coating.

Devitrifiable glasses described herein exhibit crystallization particularly surface crystallization, at elevated temperatures, preferably in the temperature range at which porcelain enamel coatings are fired commercially, that is, between 1400 and 1600° F. Phase separation, nucleation and crystal growth of one or more crystalline phases occurs during the firing process. The size and number of particles as crystal euhedra or subhedra formed during crystallization at the surface of the glass is dependent upon the composition of devitrifiable glass and the nature of the thermal treatment.

It is preferred that the number of crystallized particles be large and the size of the crystallized particles be small and that each particle have one or more well-formed crystal faces such that the greatest possible surface area is developed to enhance the catalytic activity of the coating. The glassy phase remaining after crystallization contacts the metal or ceramic substrate underlying the coating. Components comprising the adherence and surface quality system of our invention modify this residual glassy phase to provide a glass composition that will dissolve or absorb iron oxide, hydrogen and carbon oxide, gases being formed at the surface of the metal and that will adhere strongly to the metal without inhibiting or retarding the surface crystallization of the glass.

Having thus described the invention with the detail and particularity as required by the Patent Laws, what is desired protected by Letters Patent is set forth in the following claims.

1. Ceramic coating compositions for continuous cleaning surfaces consisting essentially of 100 parts by weight of a devitrifiable base frit typically analyzing by weight 1.5 to 5% $Na_2O$, 5 to 6% $K_2O$, 0.5 to 1% $Li_2O$, 1.5 to 3.5% $Al_2O_3$, 2 to 4% $B_2O_3$, 31 to 37% $SiO_2$, 0.5 to 1.5% $F_2$, 6 to 10% $TiO_2$, up to 5% $Cr_2O_3$, 27 to 35% MnO, 4 to 5% ZnO, 6 to 10% $Sb_2O_3$, up to 2% $Fe_2O_3$, up to 1% $P_2O_5$, the foregoing components totaling 100 percent as they vary within the ranges indicated and as a separate mill addition based on the weight of the base frit, 5 to 10 parts of a barium-comprising glass frit typically analyzing by weight up to 15% $Na_2O$, up to 10% $K_2O$, 0.1 to 10% $Li_2O$, up to 5% $Al_2O_3$, 15 to 58% $B_2O_3$, up to 35% $SiO_2$, 0.1 to 10% $F_2$, up to 21% CaO, 12 to 42% BaO, up to 3.5% ZnO, up to 2% $P_2O_5$, the foregoing components totaling 100 percent as they vary within the ranges indicated and as separate mill additions based on the weight of the base frit, up to 6 parts powdered aluminum, up to 5 parts antimony oxide, up to 20 parts copper oxide and iron oxide and up to 3 parts cerium oxide, there being 1 to 6 parts aluminum powder, antimony oxide or cerium oxide or mixtures thereof.

2. A ceramic coating composition according to claim 1 consisting essentially of 2 to 5 parts antimony oxide and up to 10 parts slip forming ingredients and up to 10 parts coloring oxides.

3. Ceramic coating compositions for continuous cleaning surfaces consisting essentially of 100 parts by weight of a devitrifiable base frit typically analyzing by weight 0.1 to 20% $Na_2O$, 0.1 to 20% $K_2O$, 0.1 to 20% $Li_2O$, 16 to 26% $Al_2O_3$, up to 1% $B_2O_3$, 26 to 42% $SiO_2$, up to 8% $F_2$, up to 6% $TiO_2$, up to 10% $ZrO_2$, up to 6% CaO, up to 4% BaO, up to 4% ZnO, up to 3% $Sb_2O_3$, up to 3% $Fe_2O_3$, up to 3% $P_2O_5$, the foregoing components totaling 100 percent as they vary within the ranges indicated and as a separate mill addition based on the weight of the base frit, 18 to 30 parts of a barium-comprising glass frit typically analyzing up to 15% $Na_2O$, up to 10% $K_2O$, 0.1 to 10% $Li_2O$, up to 5% $Al_2O_3$, 15 to 58% $B_2O_3$, up to 35% $SiO_2$, 0.1 to 12% $F_2$, up to 21% CaO, 12 to 42% BaO, up to 4% ZnO, up to 2% $P_2O_5$, the foregoing components totaling 100 percent as they vary within the ranges indicated and as separate mill additions based on the weight of the base frit, up to 5 parts antimony oxide, up to 3 parts cerium oxide and 15 to 30 parts aluminum powder; there being 15 to 30 parts aluminum powder, antimony oxide or cerium oxide or mixtures thereof.

4. A ceramic coating composition according to claim 3 consisting essentially of 22 parts aluminum powder, up to 10 parts slip forming ingredients and up to 10 parts coloring oxides.

5. In ceramic coating compositions consisting essentially of 100 parts by weight of devitrifiable base frit the improvement comprising as a separate mill addition based on the weight of the devitrifiable base frit 5 to 30 parts barium-comprising glass or glass-forming compound analyzing by weight up to 15% $Na_2O$, up to 10% $K_2O$, 0.1 to 10% $Li_2O$, up to 5% $Al_2O_3$, 15 to 58% $B_2O_3$, up to 35% $SiO_2$, 0.1 to 10% $F_2$, up to 21% CaO, 12 to 42% BaO, up to 35% ZnO, up to 2% $P_2O_5$, the foregoing components totaling 100 percent as they vary within the ranges indicated and as separate mill additions based on the weight of the devitrifiable base frit, 1 to 5 parts antimony oxide, up to 20 parts copper oxide and iron oxide and up to 3 parts cerium.

6. A coating according to claim 5 consisting essentially of 100 parts of devitrifiable base frit, 5 to 10 parts of a barium comprising glass consisting of an alkali alkaline earth fluoroborate frit, 2 to 5 parts antimony oxide, up to 10 parts slip forming ingredients and up to 10 parts coloring oxides.

7. A coating according to claim 5 comprising a devitrifiable base frit analyzing 5 to 15% alkali oxides, 30 to 40% $SiO_2$, 30 to 35% $MnO_2$, 10 to 30% other oxides and fluorides and 5 to 10 parts of a barium comprising glass consisting of an alkali alkaline earth fluoroborate frit.

8. A coating according to claim 5 comprising a base frit analyzing 10 to 25% alkali oxides, 15 to 25% $Al_2O_3$, 25 to 40% $SiO_2$, 10 to 30% other oxides and fluorides and 18 to 30 parts of a barium comprising glass consisting of an alkali alkaline earth fluoroborate frit.

9. In ceramic coating compositions consisting essentially of 100 parts by weight of devitrifiable base frit the improvement comprising as a separate mill addition based on the weight of the devitrifiable base frit 5 to 30 parts barium-comprising glass or glass-forming compound analyzing by weight up to 15% $Na_2O$, up to 10% $K_2O$, 0.1 to 10% $Li_2O$, up to 5% $Al_2O_3$, 15 to 58% $B_2O_3$, up to 35% $SiO_2$, 0.1 to 10% $F_2$, up to 21% CaO, 12 to 42% BaO, up to 35% ZnO, up to 2% $P_2O_5$, the foregoing components totaling 100 percent as they vary within the ranges indicated and as separate mill additions based on the weight of the devitrifiable base frit, up to 5 parts antimony oxide, up to 3 parts cerium oxide and 15 to 30 parts aluminum powder; there being 15 to 30 parts aluminum powder, antimony oxide and cerium oxide.

References Cited

UNITED STATES PATENTS

| | | | |
|---|---|---|---|
| 3,580,733 | 5/1971 | Ott | 106—48 |
| 3,222,219 | 12/1965 | Saunders et al. | 106—48 |
| 3,598,650 | 8/1971 | Lee | 106—48 |
| 3,383,225 | 5/1968 | Stradley | 106—48 |
| 2,840,482 | 6/1958 | Knapp et al. | 106—48 |

FOREIGN PATENTS

| | | | |
|---|---|---|---|
| 1,197,067 | 7/1970 | Great Britain | 106—48 |

OTHER REFERENCES

Andrews, A.: Porcelain Enamels, Champaign, Ill., 1961, pp. 253–261 and 297–300 (TP 812A56).

ALLEN B. CURTIS, Primary Examiner

M. L. BELL, Assistant Examiner

U.S. Cl. X.R.

106—47 R, 54; 117—129

UNITED STATES PATENT OFFICE
CERTIFICATE OF CORRECTION

Patent No. 3,761,293   Dated   September 25, 1973

Inventor(s) George F. Carini, Ernest M. Hommel & James R. Twigger

It is certified that error appears in the above-identified patent and that said Letters Patent are hereby corrected as shown below:

In the Abstract - Column 1 Line 13 --becomes-- should read --become--. Column 2 Line 54 --provide-- should read --provided--. Column 4 Line 21 --purpose-- should read --purposes--. Column 4 - Table I under Frit D Actual --0.92-- should read --0.12--, --17.11-- should read --17.31--.

Column 5 - Table II under Polysaccharide Example III --1/-- should read --1/2--. Column 6 Line 38 --at-- should read --as--.

Column 7 Line 19 --accordinng-- should read --according--.

Column 8 Line 63 --panel-- should read --panels--. Column 9 Line 24 --nitriate-- should read --nitrate--. Claim 5 Column 11 Line 6 --35%ZnO-- should read --3.5%ZnO--. Claim 9 Column 12 Line 4 --35%ZnO-- should read --3.5%ZnO--.

Signed and sealed this 26th day of March 1974.

(SEAL)
Attest:

EDWARD M. FLETCHER, JR.
Attesting Officer

C. MARSHALL DANN
Commissioner of Patents